(12) United States Patent
Yasutomi et al.

(10) Patent No.: US 9,679,166 B2
(45) Date of Patent: Jun. 13, 2017

(54) SETTLEMENT TERMINAL DEVICE

(71) Applicant: PANASONIC INTELLECTUAL PROPERTY MANAGEMENT CO., LTD., Osaka (JP)

(72) Inventors: Kenya Yasutomi, Fukuoka (JP); Tsutomu Kojitani, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/666,788

(22) Filed: Mar. 24, 2015

(65) Prior Publication Data

US 2015/0278557 A1    Oct. 1, 2015

(30) Foreign Application Priority Data

Mar. 27, 2014 (JP) .................................. 2014-066690

(51) Int. Cl.
*G06F 1/16* (2006.01)
*G06F 21/86* (2013.01)
(Continued)

(52) U.S. Cl.
CPC ............ *G06F 21/86* (2013.01); *G06F 1/1626* (2013.01); *G06F 1/1684* (2013.01); *G06Q 20/08* (2013.01);
(Continued)

(58) Field of Classification Search
CPC .......... G06F 21/86; G06F 1/1684; G06F 1/16; G06F 1/1622; G06F 1/1626; G06Q 20/08;
(Continued)

(56) References Cited

U.S. PATENT DOCUMENTS 5,970,146 A    10/1999  McCall et al.
6,266,685 B1 *  7/2001  Danielson ............. G06F 1/1626
                                              361/679.4
(Continued)

FOREIGN PATENT DOCUMENTS

EP    1271427       1/2003
FR    2864286    * 12/2003 ............. G06F 17/60
(Continued)

OTHER PUBLICATIONS

The Extended European Search Report from European Patent Office (EPO) dated Jul. 28, 2015 for the related European Patent Application No. 15159094.0.

(Continued)

*Primary Examiner* — Courtney Smith
*Assistant Examiner* — Sagar Shrestha
(74) *Attorney, Agent, or Firm* — Greenblum & Bernstein, P.L.C.

(57) ABSTRACT

Provided is a settlement terminal device including a housing that includes a first face which has an operation display face, a second face which is disposed on an opposite side to the operation display face, and a step portion which is formed on one end side of the second face so as to be substantially parallel to an edge side of the one end side. A length of the housing in a thickness direction on the one end side adjacent to the step portion is larger than a length of the housing in the thickness direction which is located closer to the other end side than the step portion. An insecure region that does not have tamper resistance is formed on one end side of the housing. A secure region that has tamper resistance is formed on the other end side of the housing.

20 Claims, 14 Drawing Sheets

(51) Int. Cl.
*G06Q 20/32* (2012.01)
*G06Q 20/34* (2012.01)
*G07F 7/08* (2006.01)
*G06Q 20/08* (2012.01)

(52) U.S. Cl.
CPC .......... *G06Q 20/32* (2013.01); *G06Q 20/353* (2013.01); *G07F 7/088* (2013.01); *G07F 7/0886* (2013.01)

(58) Field of Classification Search
CPC .... G06Q 20/32; G06Q 20/353; G07F 7/0886; G07F 7/088
USPC ............. 361/679.01, 679.02, 679.21, 679.3, 361/679.56; 235/7 R, 377, 379, 380, 383
See application file for complete search history.

(56) References Cited

U.S. PATENT DOCUMENTS

| | | | |
|---|---|---|---|
| D499,134 S * | 11/2004 | Enstrom | D18/4.4 |
| 7,023,692 B2 * | 4/2006 | Mansutti | G06F 1/1626 |
| | | | 361/679.56 |
| 8,513,548 B2 * | 8/2013 | Rollet | G06F 21/83 |
| | | | 200/5 A |
| 9,595,174 B2 * | 3/2017 | Ooi | G08B 13/06 |
| 2003/0004877 A1 * | 1/2003 | Kasasaku | G06Q 20/105 |
| | | | 705/41 |
| 2003/0159044 A1 * | 8/2003 | Doyle | G06F 21/32 |
| | | | 713/176 |
| 2004/0024710 A1 | 2/2004 | Fernando et al. | |
| 2004/0167820 A1 | 8/2004 | Melick et al. | |
| 2004/0236693 A1 * | 11/2004 | Quesselaire | G06Q 20/341 |
| | | | 705/50 |
| 2005/0222958 A1 | 10/2005 | Hasegawa et al. | |
| 2007/0152058 A1 * | 7/2007 | Yeakley | G06F 17/2247 |
| | | | 235/462.01 |
| 2008/0041933 A1 * | 2/2008 | Shibasaki | G06F 21/34 |
| | | | 235/379 |
| 2008/0135617 A1 * | 6/2008 | Aviv | G06K 7/0091 |
| | | | 235/449 |
| 2009/0243872 A1 | 10/2009 | Takahashi | |
| 2011/0138464 A1 | 6/2011 | Ohta et al. | |
| 2011/0215938 A1 * | 9/2011 | Neo | G08B 21/185 |
| | | | 340/635 |
| 2012/0018288 A1 * | 1/2012 | Rollet | G06F 21/83 |
| | | | 200/5 A |
| 2014/0162598 A1 * | 6/2014 | Villa-Real | H04M 1/66 |
| | | | 455/411 |
| 2014/0164252 A1 | 6/2014 | Chai et al. | |
| 2014/0183260 A1 | 7/2014 | Sancak | |

FOREIGN PATENT DOCUMENTS

| | | |
|---|---|---|
| FR | 2864286 | 6/2005 |
| JP | 3-053044 | 5/1991 |
| JP | 7-049872 | 11/1995 |
| JP | 10-240420 | 9/1998 |
| JP | 2001-256409 | 9/2001 |
| JP | 2003-157239 | 5/2003 |
| JP | 2005-293058 | 10/2005 |
| JP | 2006-195599 | 7/2006 |
| JP | 2008-244992 | 10/2008 |
| JP | 2009-245139 | 10/2009 |
| JP | 2011-095840 | 5/2011 |
| JP | 2011-138477 | 7/2011 |
| JP | 2012-185544 | 9/2012 |
| JP | 2014-514669 | 6/2014 |
| WO | 02/13151 | 2/2002 |
| WO | 2012/149907 | 11/2012 |
| WO | 2013/021233 | 2/2013 |

OTHER PUBLICATIONS

U.S. Appl. No. 14/636,418 to Matsumoto, filed Mar. 3, 2015.
U.S. Appl. No. 14/636,400 to Matsumoto, filed Mar. 3, 2015.
U.S. Appl. No. 14/638,024 to Ninomiya, filed Mar. 4, 2015.

* cited by examiner

SETTLEMENT TERMINAL DEVICE

BACKGROUND OF THE INVENTION

1. Field of the Invention

The present invention relates to a settlement terminal device.

2. Description of the Related Art

In a credit transaction using a credit card or the like, the security of the transaction is secured by verifying whether or not a person performing the transaction is the same person as the owner of the credit card used for the transaction (identity verification). For example, the identity verification is performed by a customer signing a transaction slip, having transaction details printed thereon, which is output during a transaction process and by a store clerk visually comparing the signature and a signature written on the credit card.

In recent years, a settlement terminal device for a transaction process which is capable of inputting and displaying a signature has been realized in the form of, for example, a smartphone or a tablet terminal. The settlement terminal device includes a touch input face capable of allowing a touch input using a finger or a dedicated pen (for example, a stylus pen) and a display face. Thereby, for example, the operability for a service provider is improved to more than that with a mobile phone.

In general, an information processing apparatus such as, for example, a smartphone or a tablet terminal has a high degree of freedom in user operability and touching or pressing-down using a finger or a dedicated pen can be performed over a wide range. The information processing apparatus such as, for example, a smartphone or a tablet terminal has few protrusion portions (for example, operation buttons), has no moving portions that change the shape of a housing, and has a thin shape. It is difficult for a user to hold such an apparatus, and thus there is a higher possibility of the user failing to hold and dropping the apparatus than in other apparatuses (for example, a mobile phone).

On the other hand, for example, Japanese Patent Unexamined Publication No. 10-240420 discloses a portable information apparatus using a pen input. The portable information apparatus, disclosed in Japanese Patent Unexamined Publication No. 10-240420, which uses a pen input is configured to include a housing, a battery pack, and a display device. The housing is a flat box-shaped housing having a surface in which an opening portion is formed. The battery pack, which is detachably supported by the housing, functions as a driving power supply of the apparatus. The display device includes a display face having a function of allowing the input of information by writing by hand and is accommodated in the housing with the display face exposed to the opening portion.

The housing of the portable information apparatus is provided with a first edge portion located at the front at the side of an operator's hand, a second edge portion which is disposed separated from the first edge portion in a depth direction of the housing, and third and fourth edge portions which are disposed between the first and second edge portions so as to be separated from each other in a width direction of the housing. Anti-slipping portions for catching an operator's fingertip are formed respectively at three locations in the surface of the housing which are formed to be continuous with the second to fourth edge portions.

However, in the above-mentioned portable information apparatus of the related art, it is difficult to secure security and it is difficult for a service provider to easily hold the portable information apparatus and for a service receiver to easily perform a settlement operation.

SUMMARY OF THE INVENTION

A settlement terminal device of the present disclosure is configured to be capable of securing security, to allow a service provider to easily hold the settlement terminal device, and to allow a service receiver to easily perform a settlement operation.

A settlement terminal device of the present disclosure includes a housing that includes a first face which has an operation display face, a second face which is disposed on an opposite side to the operation display face, and a step portion which is formed on one end side of the second face so as to be substantially parallel to an edge side of the one end side. A length of the housing in a thickness direction on the one end side adjacent to the step portion is larger than a length of the housing in the thickness direction on the other end side adjacent to the step portion. An insecure region that does not have tamper resistance is formed on the one end side of the housing. A secure region that has tamper resistance is formed on the other end side of the housing.

According to the present disclosure, it is possible to secure security, to allow a service provider to easily hold a settlement terminal device, and to allow a service receiver easily to easily perform a settlement operation.

DETAILED DESCRIPTION OF THE PREFERRED EMBODIMENTS

Hereinafter, exemplary embodiments of the present disclosure will be described with reference to the accompanying drawings.

Background of Obtainment of Mode of the Present Disclosure

A settlement terminal device handles information to be concealed (for example, a personal identification number (PIN) of a credit card). For example, when a secure member handling information to be concealed and a secure member handling information that need not particularly be concealed are jointly present, information of a security region passes through a non-security region and in the vicinity of the non-security region, or a contact area between the security region and the non-security region increases due to an increase in the size of the security region, and thus there is the possibility of the security of the settlement terminal device deteriorating.

In a settlement process, when a service provider (for example, a store clerk) operates a settlement terminal device and when a service receiver (for example, a customer) operates the settlement terminal device, the orientation of the settlement terminal device may be changed or rotated, for example, in accordance with switching between operators in both cases. In order to perform the settlement process without delay, it is preferable that the service provider can stably grip the settlement terminal device and the service receiver easily performs a settlement operation.

Hereinafter, a settlement terminal device which is capable of securing security, is easily held by a service provider, and is easily subjected to a settlement operation by a service receiver will be described.

First Exemplary Embodiment

Figure 1A:
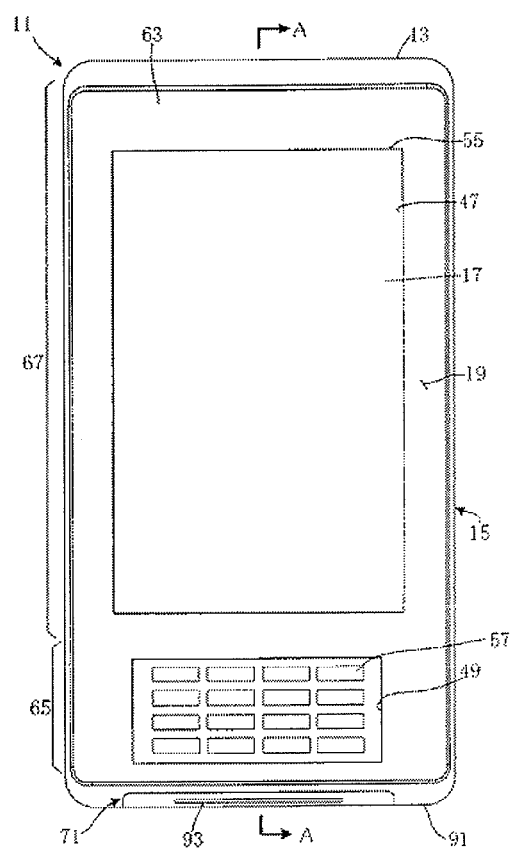
FIG. 1A is a plan view showing a configuration example of a settlement terminal device according to a first exemplary embodiment.
Figure 1B:
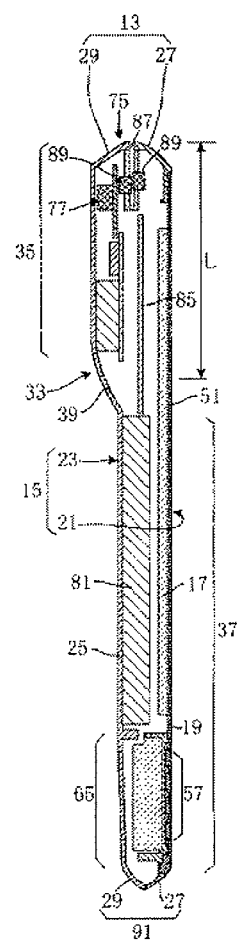
FIG. 1B is a cross-sectional view taken along line IA-IA of FIG. 1A.
Figure 1C:
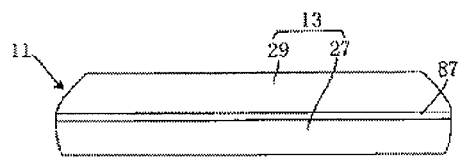
FIG. 1C is a top view of a thick wall side case end face of FIG. 1A.
Figure 2:
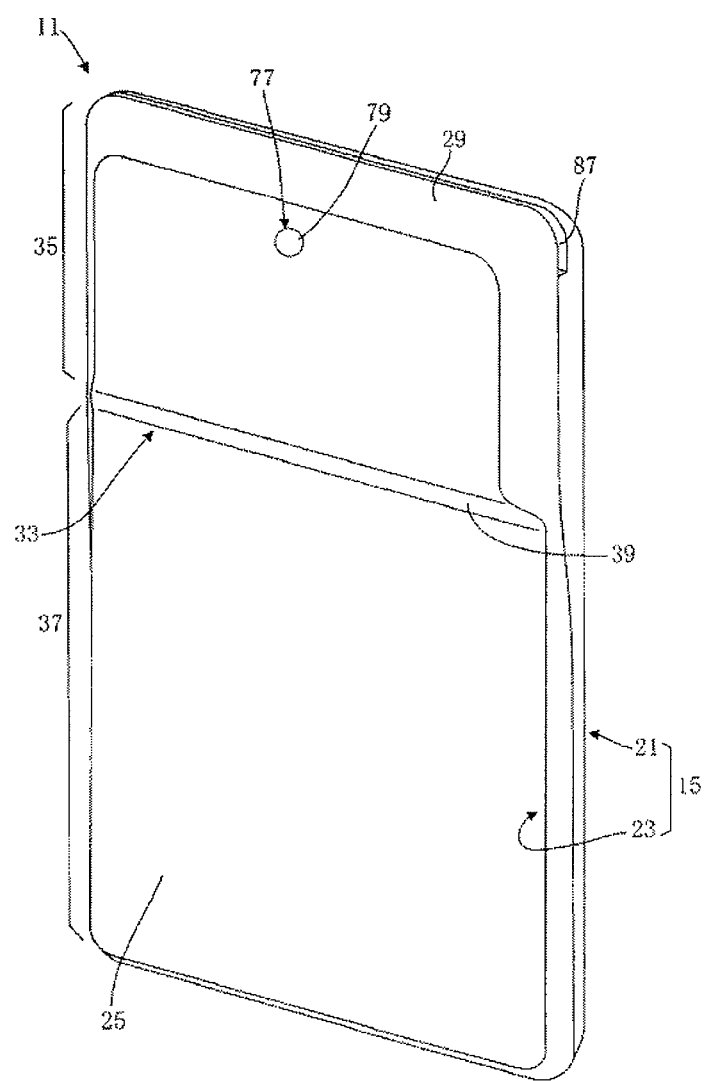
FIG. 2 is a perspective view showing a configuration example of the settlement terminal device according to the first exemplary embodiment.
Figure 3A:
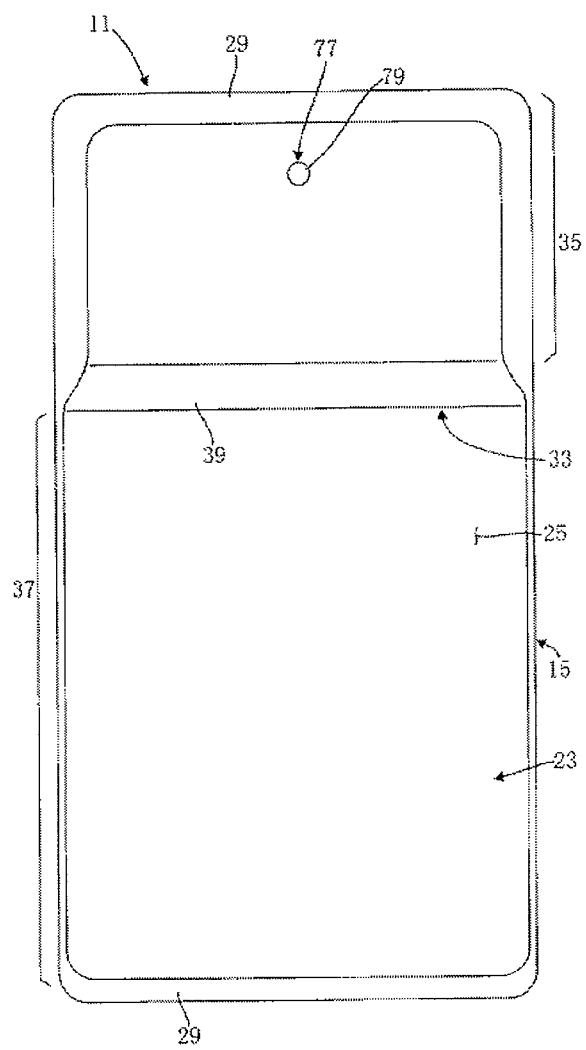
FIG. 3A is a rear view showing a configuration example of the settlement terminal device according to the first exemplary embodiment.
Figure 3B:
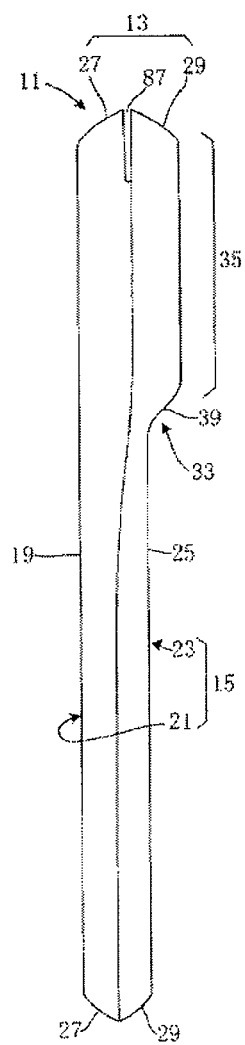
FIG. 3B is a side view of FIG. 3A.

FIG. 1A is a plan view showing an example of settlement terminal device 11 according to a first exemplary embodiment. FIG. 1B is a cross-sectional view taken along line IA-IA of FIG. 1A. FIG. 1C is a top view of thick wall side case end face 13 shown in FIG. 1A. FIG. 2 is a perspective view showing an example of settlement terminal device 11. FIG. 3A is a rear view showing an example of settlement terminal device 11. FIG. 3B is a side view of FIG. 3A.

Settlement terminal device 11 includes, for example, case 15, first input and display unit 17, and PIN input keys 57. Case 15 is an example of a housing. PIN input keys 57 are keys for inputting a PIN.

For example, case 15 is formed such that front face 19 (an example of a first face) thereof has a planar shape. Front face 19 has, for example, a rectangular shape. Case 15 is constituted by two of front case 21 and back case 23 which are separated from each other in a thickness direction of settlement terminal device 11. Front case 21 and back case 23 are coupled to each other and are fixed by, for example, a plurality of screws (not shown).

In front case 21, four peripheral edges of front face 19 are formed as surface side outer circumference inclined faces 27 having a downward gradient toward back face 25 (an example of a second face) when seen from above front face 19. In back case 23, four peripheral edges of back face 25 are formed as back face side outer circumference inclined faces 29 having an upward gradient when seen from below back face 25. In case 15, when front case 21 and back case 23 are combined, a connection portion between surface side outer circumference inclined face 27 and back face side outer circumference inclined face 29 is constituted by a ridgeline and serves as an outline.

In case 15, one end side (upper side in FIG. 3) in the longitudinal direction serves as an upper side, and the other end side (lower side in FIG. 3) in the longitudinal direction serves as a lower side. In case 15, a direction perpendicular to the longitudinal direction serves as a width direction. Case 15 (that is, settlement terminal device 11) is held by service provider 31 in an orientation in which the lower side faces the front side (see FIG. 6). In case 15, front face 19 and back face 25 are set to be substantially parallel to each other.

One end side of back face 25 in the longitudinal direction includes step portion 33, and is formed as thick portion 35 that protrudes in the thickness direction of case 15. Accordingly, back face 25 other than thick portion 35 serves as thin portion 37 which is thinner than thick portion 35. The length of thick portion 35 in the thickness direction of the housing is larger than the length of thin portion 37 in the thickness direction of the housing. Step portion 33 in the first exemplary embodiment is formed as step portion inclined face 39 having a downward gradient toward back face 25 of thin portion 37 from back face 25 of thick portion 35, but may be formed as, for example, a vertical surface. Step portion 33 is formed over the width direction of case 15, that is, formed substantially parallel to an edge side on one end side.

Figure 7:
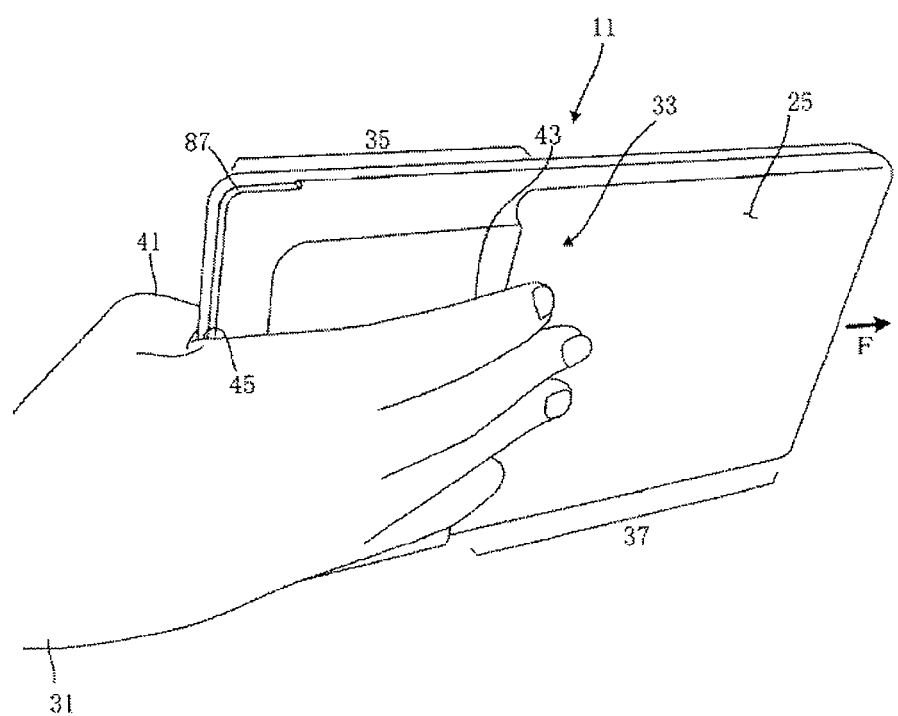
FIG. 7 is an operational diagram illustrating an example of a situation where a service provider hands in the settlement terminal device to a service receiver when seen from the back face side of the settlement terminal device according to the first exemplary embodiment.

Thick portion 35 is held (gripped) so as to be held by finger crotch 45 positioned between thumb 41 (see FIG. 7) and index finger 43 from one end side (thick wall side case end face 13) of case 15 in the longitudinal direction and to be enveloped (see FIG. 7). At this time, in case 15, thumb 41 presses front face 19 of thick portion 35, and distal end sides (nail sides) of four fingers other than thumb 41 are placed on step portion 33. Back face 25 is gripped in a state where the back face is placed on the palm. In other words, thick portion 35 can be held by being interposed between thumb 41 pressing front face 19 and at least one finger other than the thumb that comes into contact with step portion 33 and presses back face 25. Accordingly, dimension L of thick portion 35 in a direction in the longitudinal direction of case 15 is set to be shorter than a distance between the distal end side (nail side) of at least one of four fingers other than thumb 41 and finger crotch 45 positioned between thumb 41 and index finger 43. Thereby, a user can grip the case from thick wall side case end face 13 of thick portion 35 in a state where a fingertip is placed on step portion 33. Alternatively, step portion inclined face 39 of case 15 may be placed on a side surface of the index finger which faces the thumb and may be gripped.

First opening portion 47 having first input and display unit 17 disposed therein and second opening portion 49 having PIN input keys 57 disposed therein are formed in front case 21. Front face 19 of front case 21 having first opening portion 47 and second opening portion 49 formed therein are covered with transparent surface panel 51. First input and display unit 17 is configured such that, for example, pressure-sensitive type first touch input detection unit (touch panel) 53 (see FIG. 4) having a transparent sheet shape is laminated on first display unit (for example, a liquid crystal panel or an organic EL display) 55.

PIN input keys 57 are disposed on front face 19 on the other end side of case 15 in the longitudinal direction. PIN input keys 57 are printed on at least a portion of a secure region. PIN input keys 57 are disposed so as to overlap second touch input detection unit 59 (see FIG. 4). Accordingly, the operation (for example, pressing-down and touching) of PIN input keys 57 is detected by second touch input detection unit 59. Consequently, second touch input detection unit 59 is an example of an input detection unit that detects an input of authentication information. Similarly to first input and display unit 17, PIN input keys 57 may be configured such that a touch panel is laminated on a display unit or may be physical key buttons. Further, PIN input keys 57 constitute a touch panel display together with second touch input detection unit 59 by disposing a second display unit (not shown) within case 15 so as to overlap second touch input detection unit 59, and a key frame line and key-top characters of PIN input keys 57 may be displayed on the second display unit.

First input and display unit 17 is disposed on front face 19 so as to overlap at least a portion of thick portion 35.

In settlement terminal device 11, finger placement surface 63 having thumb 41 disposed thereon may be formed in front face 19 between first input and display unit 17 and thick wall side case end face 13 on one end side of case 15 in the longitudinal direction. Finger placement surface 63 can be configured as a portion of the peripheral edge of first opening portion 47 or a frame portion at which first input and display unit 17 is not disposed, instead of being particularly provided with a dedicated portion.

In case 15, the inside thereof constituted by front case 21 and back case 23 serves as a component accommodation space. Settlement terminal device 11 includes secure region 65 having tamper resistance and insecure region 67 not having tamper resistance.

The term "tamper resistance" used herein refers to resistance to unauthorized analysis and alteration of software within an information processing apparatus or hardware and unauthorized seizure of information within an information processing apparatus, alteration, and a disabling attack. For example, the tamper resistance is the difficulty in analyzing an internal structure included in software or hardware and data stored therein. It is possible to protect, for example, information of a service receiver (for example, customer) and to safely perform a transaction by including tamper resistance.

Secure region 65 is disposed on the other end side of case 15 in the longitudinal direction. Insecure region 67 is regions other than secure region 65. For example, secure region 65 accommodates secure members having information to be concealed. The secure members include, for example, a plurality of members. The secure members are disposed so as to overlap PIN input keys 57 on the other end side of case 15 in the longitudinal direction. Secure region 65 includes, for example, tamper detection unit 69 (see FIG. 4) that detects physical intrusion.

The secure members include, for example, second touch input detection unit 59, contact IC card reader unit 71, second CPU 73 functioning as a control unit controlling these units, tamper detection unit 69, and a printed circuit board (not shown).

In secure region 65, for example, a program is itself encrypted, and a control unit may store software that decrypts and executes a necessary amount at the time of executing a verified program. For example, when the closure of secure region 65 is released, secure region 65 may include a circuit for erasing secret information or overwriting the secret information with predetermined values to thereby safely perform overwriting or a circuit for stopping an operation.

Tamper detection unit 69 detects, for example, physical intrusion (disassembly, breakdown, or the like) with respect to secure region 65. For example, when attempts are made to physically intrude into secure region 65 and to read or alter internal information, tamper detection unit 69 detects the attempt and causes the above-mentioned opposing operation (for example, erasure or overwriting of secret information) to be performed.

For example, insecure region 67 accommodates insecure members that does not have information to be concealed. The insecure members include, for example, a plurality of members, and are accommodated mainly in thick portion 35. The insecure members include, for example, magnetic card reader unit 75 and out-camera 77 (example of an imaging unit) for reading a bar code. Out-camera 77 includes objective lens 79 that is exposed to back face 25 of thick portion 35. Insecure region 67 includes, for example, battery 81, main board 85, and first input and display unit 17.

Thick portion 35 is formed in insecure region 67. For example, out-camera 77, magnetic card reader unit 75, a portion of main board 85, and a portion of first input and display unit 17 are disposed in thick portion 35 so as to be laminated on each other.

Thick side case end face 13 on one end side of case 15 in the longitudinal direction is provided with card slot 87 of magnetic card reader unit 75. Magnetic card reader unit 75 includes pair of magnetic heads 89 with a groove of card slot 87 interposed therebetween. Magnetic head 89 may be disposed on one side of card slot 87.

Secure side case end face 91 on the other end side of case 15 in the longitudinal direction is provided with card insertion portion 93 of contact IC card reader unit 71.

Next, an example of a hardware configuration of settlement terminal device 11 will be described.

Figure 4:
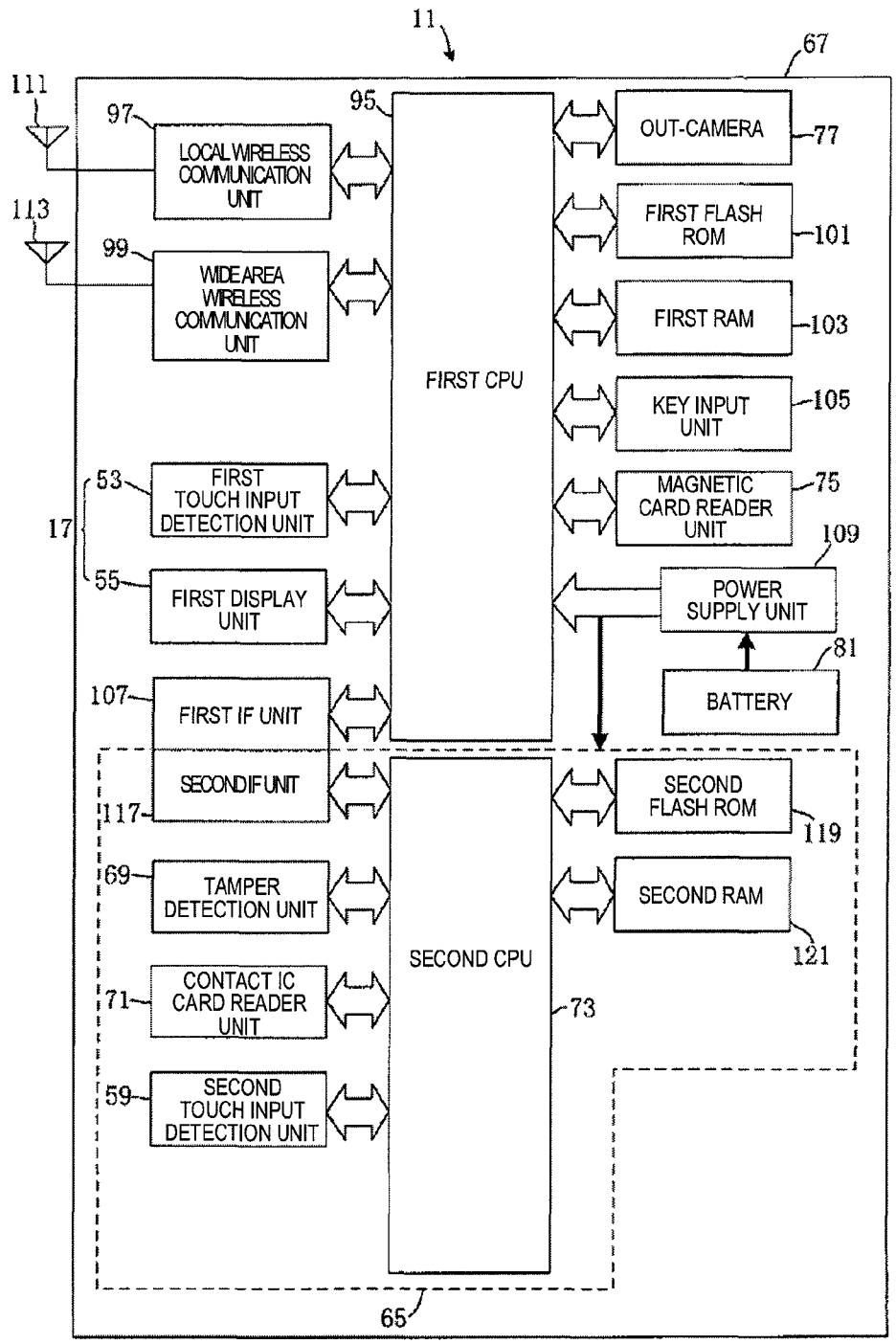
FIG. 4 is a block diagram showing a configuration example of the settlement terminal device according to the first exemplary embodiment.

FIG. 4 is a block diagram showing an example of a hardware configuration of settlement terminal device 11.

Settlement terminal device 11 includes insecure region 67 and secure region 65. Insecure region 67 indicates regions other than secure region 65 to be described later from the inside of the rectangular frame thereof shown in FIG. 4. Insecure region 67 is provided with first central processing unit (CPU) 95, local wireless communication unit 97, wide area wireless communication unit 99, first input and display unit 17, and first touch input detection unit 53.

Insecure region 67 is provided with first flash read only memory (ROM) 101, first random access memory (RAM) 103, key input unit 105, magnetic card reader unit 75, first interface (IF) unit 107, power supply unit 109, and battery 81.

In insecure region 67, various types of components are connected to first CPU 95. First CPU 95 controls all of the components in insecure region 67. First CPU 95 performs various types of control, processing, setting, determination, and the like by executing, for example, a program stored in first flash ROM 101. An execution environment in first CPU 95 of insecure region 67 is less limited than an execution environment in second CPU 73 of the secure region. For this reason, in the execution environment in the first CPU, various application programs can be executed, and an increase in functionality of settlement terminal device 11 and a wide range of applications of the settlement terminal device are facilitated.

Local wireless communication unit 97, which is connected to local wireless communication antenna 111, has a function of performing, for example, wireless LAN communication using a local wireless communication path not shown in the drawing. Local wireless communication unit 97 may perform communication (for example, Bluetooth (registered trademark) communication) other than wireless LAN communication.

Wide area wireless communication unit 99, which is connected to wide area wireless communication antenna 113, has a function of performing communication through a wide area wireless communication path (for example, a wide area network (WAN)) which is not shown in the drawing. The communication in the wide area wireless communication path may be performed, for example, through a wireless telephone line (mobile phone line such as those of wideband code division multiple access (W-CDMA), code division multiple access (CDMA), or long term evolution (LTE)).

First display unit 55 has a function of controlling a display of first input and display unit 17. First touch input detection unit 53 has a function of detecting a touch input to first input and display unit 17.

First flash ROM 101 has a function of storing various types of data. The stored data may be a business application program or data regarding business affairs, or may be a program for controlling settlement terminal device 11 (for example, insecure region 67).

First RAM 103 is a memory which is used to temporarily store processing data generated in the middle of a computation process, for example, when the computation process associated with the operation of settlement terminal device 11 (for example, a component in insecure region 67) is performed.

Key input unit 105 has a function of receiving an input from an input key (for example, a scan button for starting the reading of a bar code) which is disposed in insecure region 67. Magnetic card reader unit 75, which is disposed inside card slot 87 in FIG. 1B, has a function of reading a magnetic stripe of a magnetic card.

Power supply unit 109 receives power supplied from battery 81 and supplies power to insecure region 67 (for example, first CPU 95). First CPU 95 can supply power or stop supplying power to some or all of the circuits disposed in insecure region 67 by controlling power supply unit 109.

Insecure region 67 and secure region 65 are connected to each other through first IF unit 107 and second IF unit 117 provided in secure region 65, and transmit and receive various types of data and commands to and from each other. First IF unit 107 and second IF unit 117 can be coupled to each other.

Secure region 65 is provided with second IF unit 117, second CPU 73, tamper detection unit 69, contact IC card reader unit 71, second touch input detection unit 59, second flash ROM 119, and second RAM 121.

In secure region 65, various types of components are connected to second CPU 73. Second CPU 73 controls all of the components in secure region 65. Second CPU 73 performs various types of control and processing (for example, the reading of an IC card and the reception and collation of PIN inputs), for example, by executing a program stored in second flash ROM 119.

Tamper detection unit 69 monitors secure region 65 and detects, for example, disassembly, breakdown, or opening in secure region 65. In other words, tamper detection unit 69 detects the presence or absence of an abnormality in secure region 65. When the above-mentioned phenomenon is detected by tamper detection unit 69, for example, a settlement process may be stopped, or the presence of an abnormality in secure region 65 may be reported by first input and display unit 17.

Contact IC card reader unit 71 includes card insertion portion 93. When a contact IC card is inserted into card insertion portion 93, an electrode (not shown) which is built into contact IC card reader unit 71 is electrically connected to an electrode provided on the surface of the contact IC card.

Second touch input detection unit 59 has a function of detecting a touch input to PIN input keys 57. For example, second touch input detection unit 59 may detect an input to a PIN pad including physical keys or soft keys for inputting a PIN. Second touch input detection unit 59 may detect a signature input using, for example, a finger or a stylus pen. Second touch input detection unit 59 may detects a PIN input performed by writing by hand using, for example, a finger or a stylus pen.

Second flash ROM 119 has a function of storing various types of data. The stored data is a program for controlling settlement terminal device 11 (for example, a component in secure region 65), a program for performing collation between PINs input from second touch input detection unit 59 during settlement, or the like.

Second RAM 121 is a memory which is used to temporarily store processing data generated in the middle of a computation process, for example, when the computation process associated with the operation of settlement terminal device 11 (for example, secure region 65) is performed.

In this manner, settlement terminal device 11 includes insecure region 67 and secure region 65. Authentication information of a card used for settlement is input to PIN input keys 57 in secure region 65. Accordingly, settlement terminal device 11 can input the authentication information of the card used for settlement in a state where safety is secured and can also secure "tamper resistance". A "secure" portion requiring "tamper resistance" is localized in secure region 65 and is miniaturized (for example, see FIG. 1B).

On the other hand, in insecure region 67, for example, a large number of information terminals (for example, smartphones and tablet terminals) are being distributed for customer use and some of them may be adopted as platforms.

A general-purpose platform is adopted in insecure region 67, and thus the reuse and recycling of development assets of application software for settlement (settlement application) and application software used for other business affairs (business application) are facilitated. The settlement application and other business applications are processed by, for example, first CPU 95 in insecure region 67 which has a high computation processing ability, and thus are flexibly operated without stress. It is possible to easily use various business applications and settlement processes having various settlement schemes.

Next, an example of an action of settlement terminal device 11 will be described.

Figure 5:
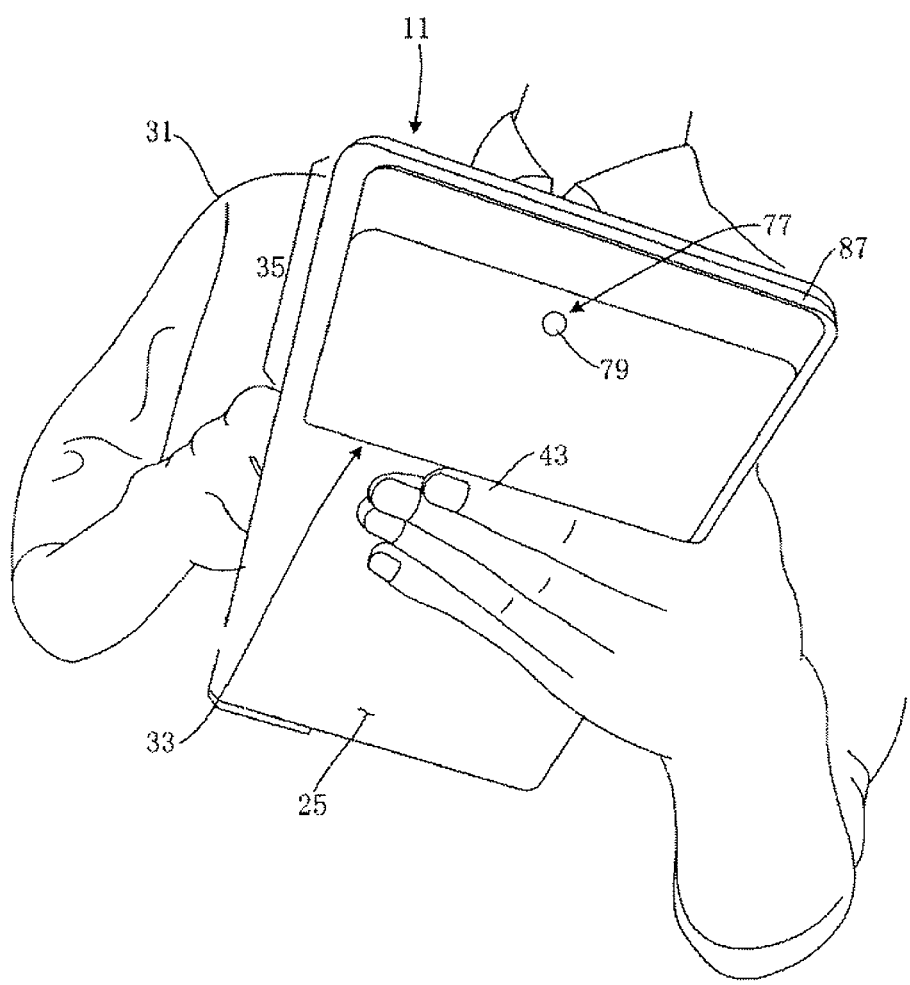
FIG. 5 is an operational diagram illustrating an example of an operation situation of a service provider when seen from the back face side of the settlement terminal device according to the first exemplary embodiment.
Figure 6:
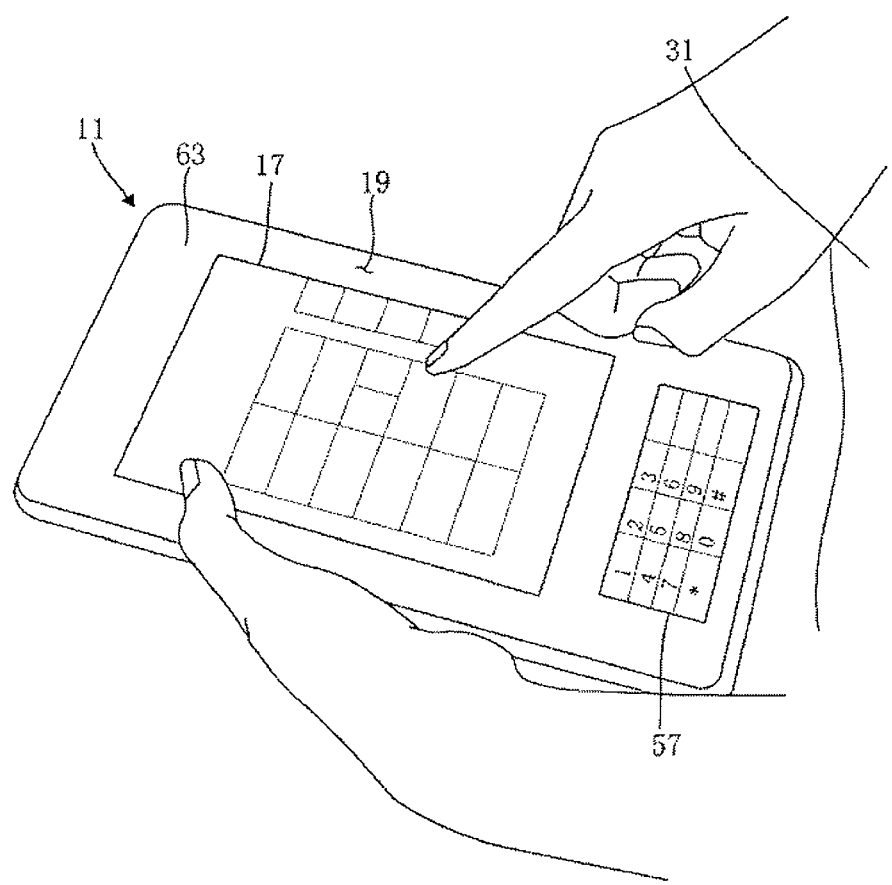
FIG. 6 is an operational diagram illustrating an example of an operation situation of a service provider when seen from the front face side of the settlement terminal device according to the first exemplary embodiment.
Figure 8:
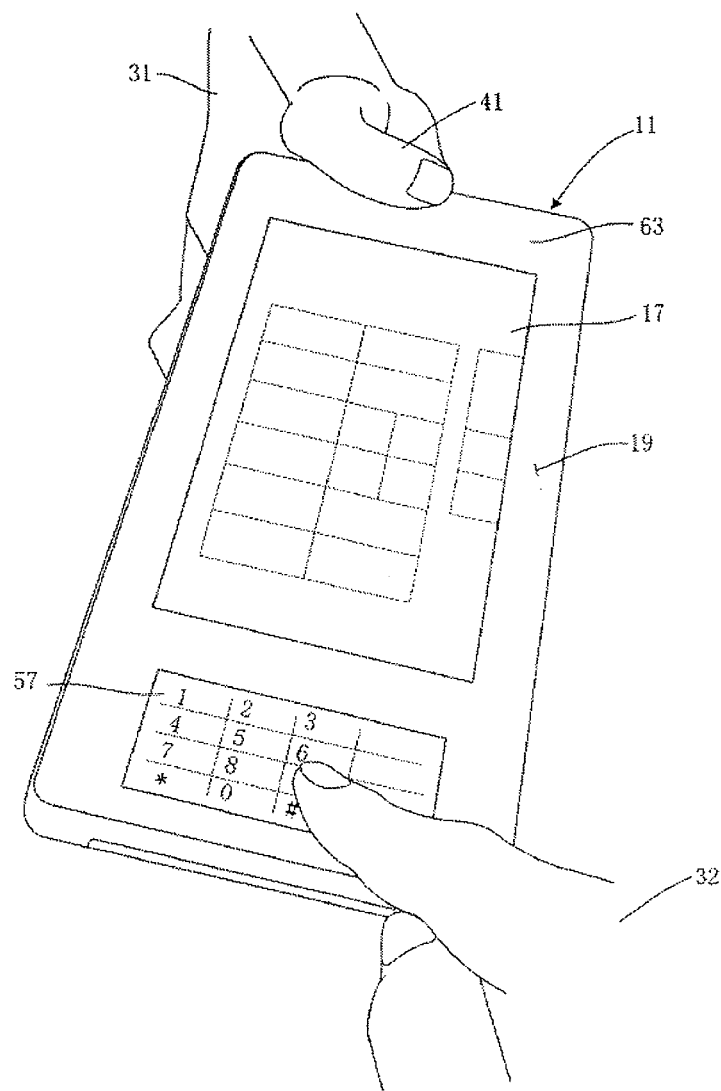
FIG. 8 is an operational diagram illustrating an example of a situation where a service provider holds a thick portion and a service receiver operates PIN input keys according to the first exemplary embodiment.

FIG. 5 is an operational diagram illustrating an operation situation of service provider 31 when seen from the back face side of settlement terminal device 11. FIG. 6 is an operational diagram illustrating an operation situation of service provider 31 when seen from the front face side of settlement terminal device 11. FIG. 7 is an operational diagram illustrating a situation where service provider 31 hands in settlement terminal device 11 to service receiver 32 (see FIG. 8) when seen from the back face side of the settlement terminal device. FIG. 8 is an operational diagram illustrating a situation where service provider 31 holds thick portion 35 and service receiver 32 operates PIN input keys 57.

Settlement terminal device 11 has portability. As shown in FIGS. 5 and 6, service provider 31 holds case 15 in an orientation in which PIN input keys 57 face the front side, for example, until a step of inputting authentication information (for example, a PIN or a signature) is performed in a settlement process. Service provider 31 inputs product information, a settlement method, a payment amount, the number of payments, and the like using, for example, first input and display unit 17 and first touch input detection unit 53. In this step, for example, a magnetic card passes through magnetic card reader unit 75, or a contact card is inserted into contact IC card reader unit 71. When the reading of the card and the inputs of the product information, the settlement method, the payment amount, the number of payments, and the like are terminated, a timing at which authentication information is to be input is set.

In the step of inputting authentication information, for example, service provider 31 holds thick portion 35 and rotates case 15 by a predetermined angle (for example, 180 degrees) so that the case faces service receiver 32 side, as shown in FIG. 7. Then, as shown in FIG. 8, in settlement terminal device 11, PIN input keys 57 face the front side when seen from service receiver 32 side. In other words, thick portion 35 is disposed on the side distant from service receiver 32 with input and display unit 17 interposed therebetween, and secure region 65 is disposed on the side close to service receiver 32. Insecure region 67 mounted on thick portion 35 and secure region 65 mounted on thin portion 37 are disposed on mutually opposite sides in case 15. Here, the term "front side when seen from service receiver 32 side" refers to the lower side of characters of case 15 which are displayed on first input and display unit 17 or PIN input keys 57 with respect to the upright direction of these characters.

Accordingly, service receiver 32 easily perform a settlement operation of inputting a PIN number, and service provider 31 easily holds settlement terminal device 11 by thick portion 35 (see FIG. 7). In addition, settlement terminal device 11 is provided with step portion 33 of thick portion 35, and thus can be reliably held (gripped) even against a tensile force F applied from service receiver 32 side when the settlement terminal device is attempted to be stolen.

Thick portion 35 accommodates members, such as out-camera 77 and magnetic card reader unit 75 for reading a bar code in addition to ordinary imaging, which have a larger thickness than other members. For this reason, the thickness of thick portion 35 is larger than those of other portions, and thus contributes to an improvement in holdability.

The secure members (second CPU 73, contact IC card reader unit, second touch input detection unit 59, tamper detection unit 69, and the like) of secure region 65 are disposed in a concentrated manner with a minimum required space on the opposite side to thick portion 35 with input and display unit 17 interposed therebetween. Therefore, the securement of tamper resistance of secure region 65 is facilitated, and thus it is possible to secure security. In addition, since the secure members of secure region 65 do not include a member becoming an obstacle in reducing the thickness of secure region 65, it is also possible to reduce the thickness of secure region 65. Accordingly, a shape formed by disposing the insecure members having a large thickness and the secure members capable of being reduced in size in the right places can exhibit functionality (for example, holdability, the ease of settlement, and the easiness of tamper resistance securement).

In settlement terminal device 11, objective lens 79 of out-camera 77 is disposed on back face 25 of thick portion 35. In out-camera 77, for example, an imaging element and a substrate are provided lined up in a direction along an optical axis of objective lens 79 with respect to objective lens 79.

Out-camera 77 captures, for example, an image of a bar code attached to a product, and product information and the like are acquired from the captured image by first CPU 95. An in-camera that images service provider 31 or service receiver 32 may be used instead of out-camera 77. In this case, an objective lens of the in-camera is provided on front face 19 side, and objective lens 79 of back face 25 is not provided.

In settlement terminal device 11, contact IC card reader unit 71 is disposed in secure region 65. Card slot 87 of magnetic card reader unit 75 is disposed in thick portion 35. Accordingly, card slot 87 of magnetic card reader unit 75 can contribute to an increase in the wall thickness of thick portion 35, and can also contribute to a reduction in the wall thickness of secure region 65.

In settlement terminal device 11, when PIN input keys 57 are made to face service receiver 32 side while thick portion 35 is held, thumb 41 holding thick portion 35 is disposed on finger placement surface 63. When thumb 41 falls within finger placement surface 63, thumb 41 is not on first input and display unit 17 and first touch input detection unit 53 which is laminated on first input and display unit 17. In other words, thumb 41 does not touch first input and display unit 17. Thereby, it is possible to suppress an erroneous operation due to a careless contact with first input and display unit 17. The surface of first input and display unit 17 is an example of an operation display face.

In this manner, according to settlement terminal device 11, it is possible to secure security, to allow service provider 31 to easily hold the settlement terminal device, and to allow service receiver 32 to easily perform a settlement operation.

Second Exemplary Embodiment

Figure 9:
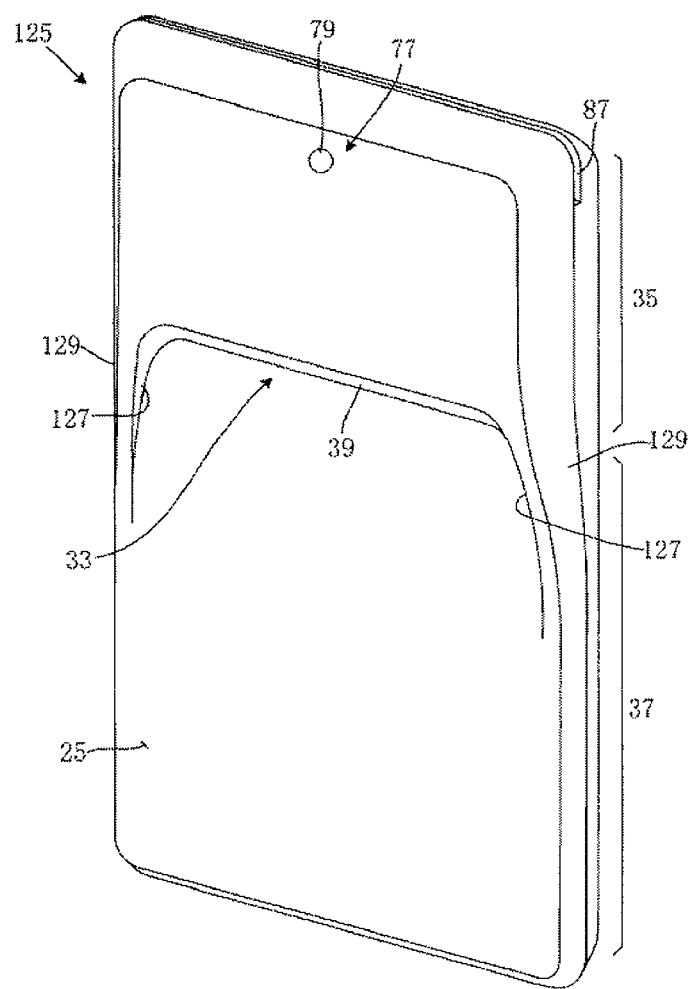
FIG. 9 is a perspective view showing a configuration example of a settlement terminal device according to a second exemplary embodiment.
Figure 10A:
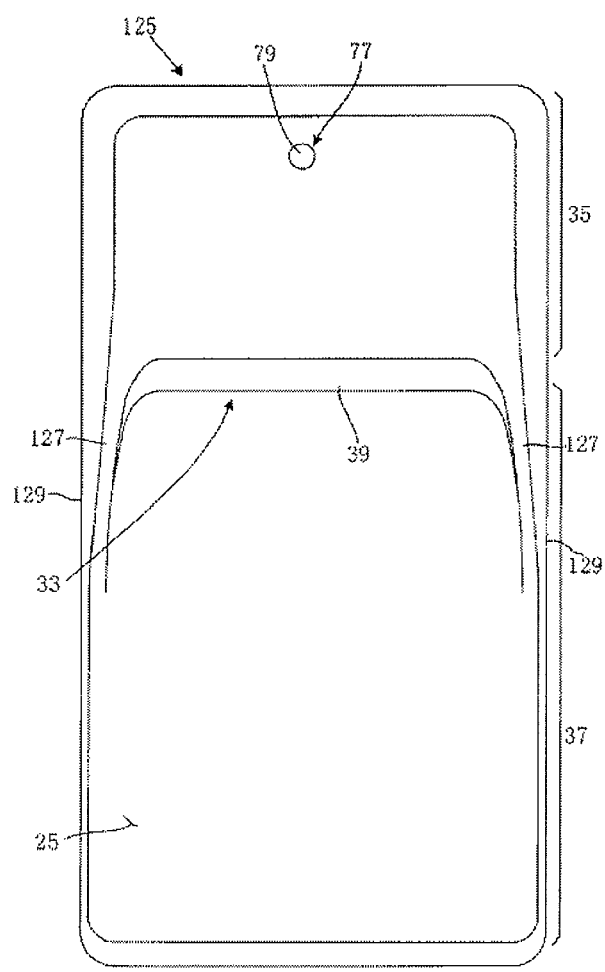
FIG. 10A is a rear view showing a configuration example of the settlement terminal device according to the second exemplary embodiment.
Figure 10B:
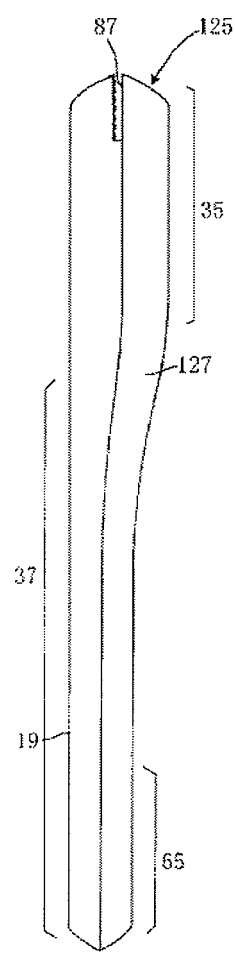
FIG. 10B is a side view of FIG. 10A.

FIG. 9 is a perspective view showing an example of settlement terminal device 125 according to a second exemplary embodiment. FIG. 10A is a rear view showing an example of settlement terminal device 125. FIG. 10B is a side view of FIG. 10A. In FIG. 9 and FIGS. 10A and 10B, the same members as the members shown in FIGS. 1 to 8 are denoted by the same reference numerals and signs, and a repeated description thereof will be omitted or simplified.

Settlement terminal device 125 includes pair of wall portions 127. Wall portions 127 are connected to both ends of step portion 33 in an extension direction of the step portion and formed on back face 25 of thin portion 37. The wall portions gradually reduce in height as a distance between the wall portions and thick portion 35 increases, and are located on the same level as back face 25 of thin portion 37. A reduction in the height of wall portion 127 is equivalent to a reduction in the length of a housing along a thickness direction of the housing.

For example, service provider 31 may grip settlement terminal device 125 by holding one of pair of wall portions 127 by thumb 41 and index finger 43 or by finger crotch 45 from thick wall side case end face 13.

Service provider 31 may grip settlement terminal device 125 from device side wall portion 129 in a state where at least distal end sides (nail sides) of four fingers other than thumb 41 are placed on a U-shaped region surrounded by step portion 33 and wall portion 127 in back face 25 and back face 25 is placed on the palm. In this case, horizontal holding (not shown) for gripping device side wall portion 129 is set, with respect to vertical holding (see FIG. 7) for gripping thick wall side case end face 13.

According to the vertical holding, for example, even when settlement terminal device 125 is about to slide down from the palm of service provider 31, either one or both of wall portions 127 or step portion 33 comes into contact with index finger 43 or the side surface of a little finger of service provider 31, and thus it is possible to prevent the sliding-down of settlement terminal device 125.

In the horizontal holding, service provider 31 holds one of wall portions 127 by finger crotch 45 from device side wall portion 129. In this case, service provider 31 places a portion positioned between a first joint and a second joint of thumb 41 in the vicinity of a corner portion between front face 19 and the side surface of settlement terminal device 125. In addition, service provider 31 places four fingers other than thumb 41 in a region surrounded by step portion 33 and wall portion 127 in back face 25. Thereby, settlement terminal device 125 is gripped. In this gripped state, since one wall portion 127 is held by thumb 41 and index finger 43 of service provider 31 or by finger crotch 45, the gripped state of settlement terminal device 125 is stable, and thus it is possible to prevent sliding-down.

In settlement terminal device 125, when service provider 31 holds thick portion 35 and rotates case 15 so that the case faces service receiver 32 side, wall portion 127 effectively acts. As shown in FIG. 5, for example, it is assumed that service provider 31 holds thin portion 37 by his or her left hand in a step before authentication information is input. In this case, for example, front face 19 is pressed by thumb 41, and back face 25 is pressed by the other fingers. In this case, for example, index finger 43 is placed on step portion 33.

When case 15 is rotated so as to face service receiver 32 side, service provider 31 changes, for example, the holding hand from the left hand shown in FIG. 5 which holds case 15 and holds thick portion 35 by his or her right hand as shown in FIG. 7. For example, service provider 31 holds case 15 by pressing front face 19 of thick portion 35 by thumb 41 of the right hand and placing at least one finger other than the thumb on step portion 33. In this case, wall portions 127 are present at both ends of step portion 33 in an extension direction of the step portion, and thus it is possible to prevent the lateral sliding of a finger placed on step portion 33 and the removal of the finger from step portion 33. In other words, the holding can be made difficult to be released. Therefore, it is possible to prevent settlement terminal device 125 from being dropped in a case where case 15 is rotated so as to face service receiver 32 side.

In this manner, according to settlement terminal device 125, it is possible to secure security, to allow service provider 31 to easily hold settlement terminal device, and to allow service receiver 32 to easily perform a settlement operation.

The present disclosure is not limited to the configuration of the above-mentioned embodiment, and can be applied to any configuration as long as the configuration is capable of realizing functions shown in claims or functions of the components of this embodiment.

For example, the above-mentioned exemplary embodiments illustrate that a PIN is input as authentication information, but other authentication information (for example, a signature, handwritten PIN information, fingerprint information, and other authentication information) may be input.

What is claimed is:

1. A settlement terminal device, comprising: a housing that includes: a first face which includes an operation display face; and a second face which is disposed on an opposite side to the operation display face, the second face including a third face, a fourth face, and a step, the second face further including a pair of walls connected to ends of the step and extending along edges of the fourth face, wherein the step connects the third face and the fourth face, wherein a thickness of the housing between the first face and the third face is larger than a thickness of the housing between the first face and the fourth face, wherein a thickness of the housing between the first face and the pair of walls is larger than the thickness of the housing between the first face and the fourth face, wherein an insecure region that does not have tamper resistance is formed on one end of the housing, wherein a secure region that has tamper resistance is formed on an other end of the housing, and wherein the operation display face overlaps the step when viewed from a thickness direction.

2. The settlement terminal device of claim 1, further comprising:
a camera disposed in the insecure region.

3. The settlement terminal device of claim 1, further comprising:
a card slot for a magnetic card disposed in the insecure region, and
an input that detects an input of authentication information and is disposed in the secure region.

4. The settlement terminal device of claim 1, the wall pair of walls includes a first wall connected to a first end of the step and a second wall connected to a second end of the step, the first wall extending substantially parallel with the second wall.

5. The settlement terminal device of claim 1, wherein the operation display face is disposed at the first face so as to be separated from an edge of the first face by a predetermined distance or more.

6. The settlement terminal device of claim 1, wherein the pair of walls reduce in height along the thickness direction of the housing as a distance from the end of the step increases.

7. A portable settlement terminal device, comprising: a housing that includes: a first face which includes an operation display face; and a second face which is disposed on an opposite side to the operation display face, the second face including a third face, a fourth face, and a step, the second face further including a pair of walls connected to ends of the step and extending along edges of the fourth face, wherein the step connects the third face and the fourth face, wherein a thickness of the housing between the first face and the third face is larger than a thickness of the housing between the first face and the fourth face, wherein a thickness of the housing between the first face and the pairs of walls is larger than the thickness of the housing between the first face and the fourth face, wherein an insecure region is formed on one end of the housing, wherein a secure region is formed on the other end of the housing, wherein the secure region includes the operation display face to which at least authentication information of a service receiver is input, and wherein the operation display face overlaps the step when viewed from a thickness direction.

8. The portable settlement terminal device of claim 7, further comprising:
a camera disposed in the insecure region.

9. The portable settlement terminal device of claim 7, further comprising:
a card slot for a magnetic card disposed in the insecure region.

10. The portable settlement terminal device of claim 7, further comprising:
an input that detects an input of authentication information and is disposed in the secure region.

11. The portable settlement terminal device of claim 7, wherein the operation display face is disposed at the first face so as to be separated from an edge of the first face by a predetermined distance or more.

12. The settlement terminal device of claim 1, wherein the operation display face overlaps both the third face and the fourth face when viewed from the thickness direction.

13. The settlement terminal device of claim 1, wherein the insecure region is formed between the first face and the third face, and the secure region is formed between the first face and the fourth face.

14. The settlement terminal device of claim 1, further comprising:
 a card slot for a magnetic card, the card slot being configured to receive the magnetic card with the magnetic card being substantially parallel to at least one of the first face, the third face, and the fourth face.

15. The settlement terminal device of claim 1, wherein each of the third face and the fourth face is planar.

16. The settlement terminal device of claim 1, wherein the step is substantially parallel to at least one edge side of the housing.

17. The settlement terminal device of claim 1,
 wherein each of the third face and the fourth face is planar,
 wherein a width of the third face is shorter than a width of the fourth face, and
 wherein a length of the third face is shorter than a length of the fourth face.

18. The settlement terminal device of claim 17, wherein the third face is connected with the housing via a tapered surface that extends outward from sides of the third face to a periphery of the housing.

19. The settlement terminal device of claim 18, wherein a cross-sectional area defined by the third face, the tapered surface, and the step in each of the thickness direction and a width direction of the settlement terminal device is trapezoidal.

20. A settlement terminal device, comprising: a housing; an insecure region that does not have tamper resistance and is positioned in a first portion of the housing; and a secure region that has tamper resistance and is positioned in a second portion of the housing, wherein the housing includes: a first face that includes an operation display face; and a second face that is disposed on an opposite side of the operation display face, the second face including a first flat face, a second flat face substantially parallel to the first flat face, and a step connecting the first flat face and the second flat face, the second face further including a pair of walls connected to ends of the step and extending along edges of the second flat face, wherein a thickness of the housing between the first face and the first flat face is larger than a thickness of the housing between the first face and the second flat face, wherein a thickness of the housing between the first face and the pairs of walls is larger than the thickness of the housing between the first face and the second flat face, wherein the operation display face overlaps the step when viewed from a thickness direction.

* * * * *